(12) United States Patent
Nordbruch

(10) Patent No.: US 7,378,988 B2
(45) Date of Patent: May 27, 2008

(54) METHOD FOR WARNING A DRIVER WHEN PARKING A MOTOR VEHICLE ON A LONGITUDINALLY INCLINED ROADWAY WITHOUT WHEEL DEFLECTION

(75) Inventor: Stefan Nordbruch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 11/251,130

(22) Filed: Oct. 14, 2005

(65) Prior Publication Data

US 2006/0097859 A1    May 11, 2006

(30) Foreign Application Priority Data

Oct. 14, 2004    (DE)    ............... 10 2004 050 052

(51) Int. Cl.
- G08G 1/00    (2006.01)
- G60Q 1/00    (2006.01)
- G08B 21/00    (2006.01)
- B60K 28/14   (2006.01)

(52) U.S. Cl. ............... 340/932.2; 340/425.5; 340/438; 340/440; 340/686.1; 340/689; 180/282

(58) Field of Classification Search ............ None
See application file for complete search history.

(56) References Cited

FOREIGN PATENT DOCUMENTS

| DE | 4329571 | 3/1994 |
| DE | 298 08 977 | 9/1998 |
| DE | 10217717 | 7/2003 |
| DE | 1 004052357 A1 * | 5/2006 |
| JP | 1297363 | 11/1989 |
| KR | 552766 B1 * | 2/2006 |

* cited by examiner

*Primary Examiner*—Julie Bichngoc Lieu
(74) *Attorney, Agent, or Firm*—Kenyon & Kenyon LLP

(57) ABSTRACT

A method for warning a driver when parking a motor vehicle, in which an inclination variable describing the roadway inclination in the longitudinal direction of the vehicle is ascertained, a vehicle standstill is ascertained, a steering angle variable describing the steering angle is ascertained, and in the case of a standstill of the vehicle a driver warning information is output if the inclination variable fulfills a specified inclination condition and the steering angle variable fulfills a specified steering angle condition.

8 Claims, 3 Drawing Sheets

METHOD FOR WARNING A DRIVER WHEN PARKING A MOTOR VEHICLE ON A LONGITUDINALLY INCLINED ROADWAY WITHOUT WHEEL DEFLECTION

FIELD OF THE INVENTION

The present invention relates to a method for issuing a driver warning when parking a motor vehicle.

BACKGROUND INFORMATION

German Published Patent Application No. 298 08 977 describes a motor vehicle having at least one immobilization means, at least one signal device, at least one first contact device on at least one of the immobilization devices for the motor vehicle and at least one person sensor device for establishing the presence or absence of a driver. In this instance, the first contact device as well as the person sensor device are connected to the signal device. The signal device has a first signal output means which emits a signal if the first contact device signals a non-secured immobilization means for the motor vehicle and the person sensor device signals the absence of the driver.

SUMMARY OF THE INVENTION

The present invention relates to a method for parking a motor vehicle, in which
 an inclination variable describing the roadway inclination in the longitudinal direction of the vehicle is ascertained,
 a vehicle standstill is ascertained and
 a steering angle variable describing the steering angle is ascertained, and
 in the case of a standstill of the vehicle a driver warning information is output if
 the inclination variable fulfills a specified inclination condition and
 the steering angle variable fulfills a specified steering angle condition.

In this manner, a driver may be alerted to a vehicle that is insufficiently secured against rolling away.

One advantageous refinement of the present invention is characterized in that
 the steering angle variable is the steering angle,
 the inclination condition is fulfilled if the magnitude of the inclination variable exceeds an inclination limit value and
 the steering angle condition is fulfilled if the magnitude of the steering angle falls below a steering angle limit value.

Thus it is possible to detect in a simple manner whether the steering wheel was turned to a sufficient degree when parking on a roadway inclined in the direction of travel.

One advantageous refinement of the present invention is characterized in that the steering angle limit value is a function of the inclination limit value. This makes it possible to require a greater steering angle on roadways that are more strongly inclined.

One advantageous refinement of the present invention is characterized in that the steering angle variable is the steering angle direction and
 that the inclination condition is fulfilled if the magnitude of the inclination variable exceeds an inclination limit value and
 the steering angle condition is fulfilled if the steering angle direction points in the opposite direction as a specified setpoint steering angle direction.

In this manner, the driver is warned if the steering wheel of the parked vehicle is turned in the wrong direction.

One advantageous refinement of the present invention is characterized in that
 the inclination variable is used to ascertain whether the roadway in the longitudinal direction of the vehicle is inclined uphill or downhill and
 the setpoint steering angle direction in a downhill inclined roadway and in an uphill inclined roadway points in different directions.

One advantageous refinement of the present invention is characterized in that the inclination variable is the longitudinal inclination of the roadway. The longitudinal inclination of the roadway may be measured directly using an inclination sensor or may be ascertained e.g. from other sensor data (e.g. from the data of the coasting process relating to driving dynamics).

An advantageous refinement of the present invention is characterized in that in a standstill of the vehicle additionally a warning information is output if
 the inclination variable fulfills a specified inclination condition (e.g. exceeds a limit value) and
 the handbrake or the immobilization brake or the parking brake is detected as not activated.

The driver is thereby alerted to the fact that in addition to setting the steering angle other measures must be undertaken as well in order to prevent the vehicle from rolling away.

For this reason, a advantageous refinement of the present invention is also characterized in that in a standstill of the vehicle additionally a warning information is output if
 the inclination variable fulfills a specified inclination condition (e.g. exceeds a limit value) and
 in a vehicle having a manual transmission no gear is engaged or in a vehicle having an automatic transmission the latter is not set to the parking position.

An advantageous refinement of the present invention is characterized in that, when the steering angle variable fulfills the steering angle condition, a driver-independent steering-servo-system sets the steering angle in such a way that the steering angle variable no longer fulfills the steering angle condition. To this end, for example, a parking assistant system may be used.

The present invention further comprises a device for warning a driver when parking a motor vehicle, including
 inclination ascertainment means for ascertaining an inclination variable describing the roadway inclination in the longitudinal direction of the vehicle,
 standstill detection means for ascertaining a vehicle standstill,
 steering angle ascertainment means for ascertaining a steering angle variable describing the steering angle,
 as well as driver warning means for issuing a driver warning, which are triggered by the inclination ascertainment means, the standstill detection means and the steering angle ascertainment means in such a way that a driver warning is output if
 the vehicle is at a standstill and
 the inclination variable fulfills a specified inclination condition and
 the steering angle variable fulfills a specified steering angle condition.

One advantageous refinement of the present invention is characterized in that the inclination ascertainment means are an inclination sensor.

One advantageous refinement of the present invention is characterized in that the steering angle ascertainment means are a steering angle sensor.

Of course, the advantageous refinements of the method according to the present invention manifest themselves also as advantageous refinements of the device according to the present invention, and vice versa.

DETAILED DESCRIPTION

Parking at roadway inclinations that rise or fall in the direction of travel, i.e. on longitudinally inclined roadways, may result in the vehicle rolling away. If the handbrake is not set or defective and if no gear is engaged, then the vehicle may roll away due to the indicated circumstances when the driver has left the vehicle.

In order to prevent such problems, advantageously a gear should be engaged in a vehicle and in any event the handbrake should be set in a vehicle after parking it on a longitudinally inclined roadway. The essence of the present invention lies in the fact that in addition to the described measures the wheels are deflected such that they point
- to the right in the case of a roadway sloping downward in the direction of travel and
- to the left in the case of an roadway sloping upward in the direction of travel.

weisen. These specifications of direction of the steering angles in this context always refer to countries with right-hand traffic. In the case of left-hand traffic, the direction of the steering angles is to be reversed. These correlations are shown in FIG. 1.

Figure 1:
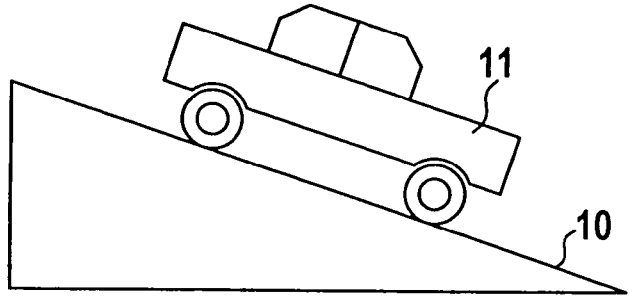
FIG. 1 shows the direction of the steering angle in a parked vehicle.
Figure 1:
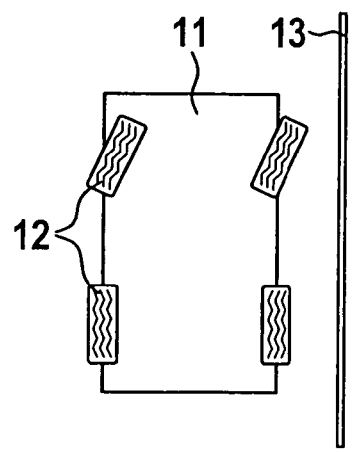
Figure 1:
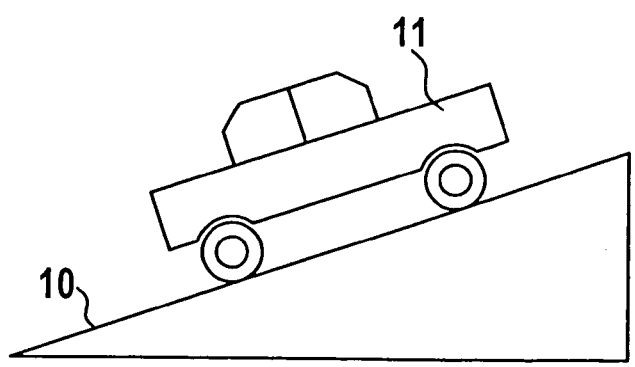
Figure 1:
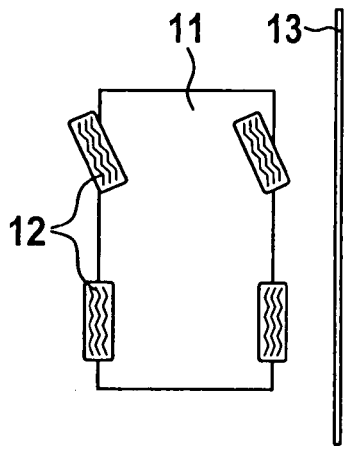

FIG. 1 shows in each instance on the left a side view and on the right a top view of a vehicle on a roadway. The two upper pictures refer to a roadway sloping downward in the direction of travel, while the two lower pictures refer to a roadway sloping upward in the direction of travel.

In this instance, 10 respectively indicates the roadway and 11 the front of the vehicle. 12 indicates the tires of the vehicle and 13 the edge of the roadway.

The roadway inclination may be ascertained e.g. using inclination sensors existing in many modern vehicles. The steering angle may be ascertained e.g. by the steering angle sensor.

In one refinement of the present invention, a check is performed to verify
- whether the handbrake is set or the immobilization brake is secured,
- whether a gear is engaged and
- whether a steering wheel is adjusted in accordance with the inclination.

Figure 2:
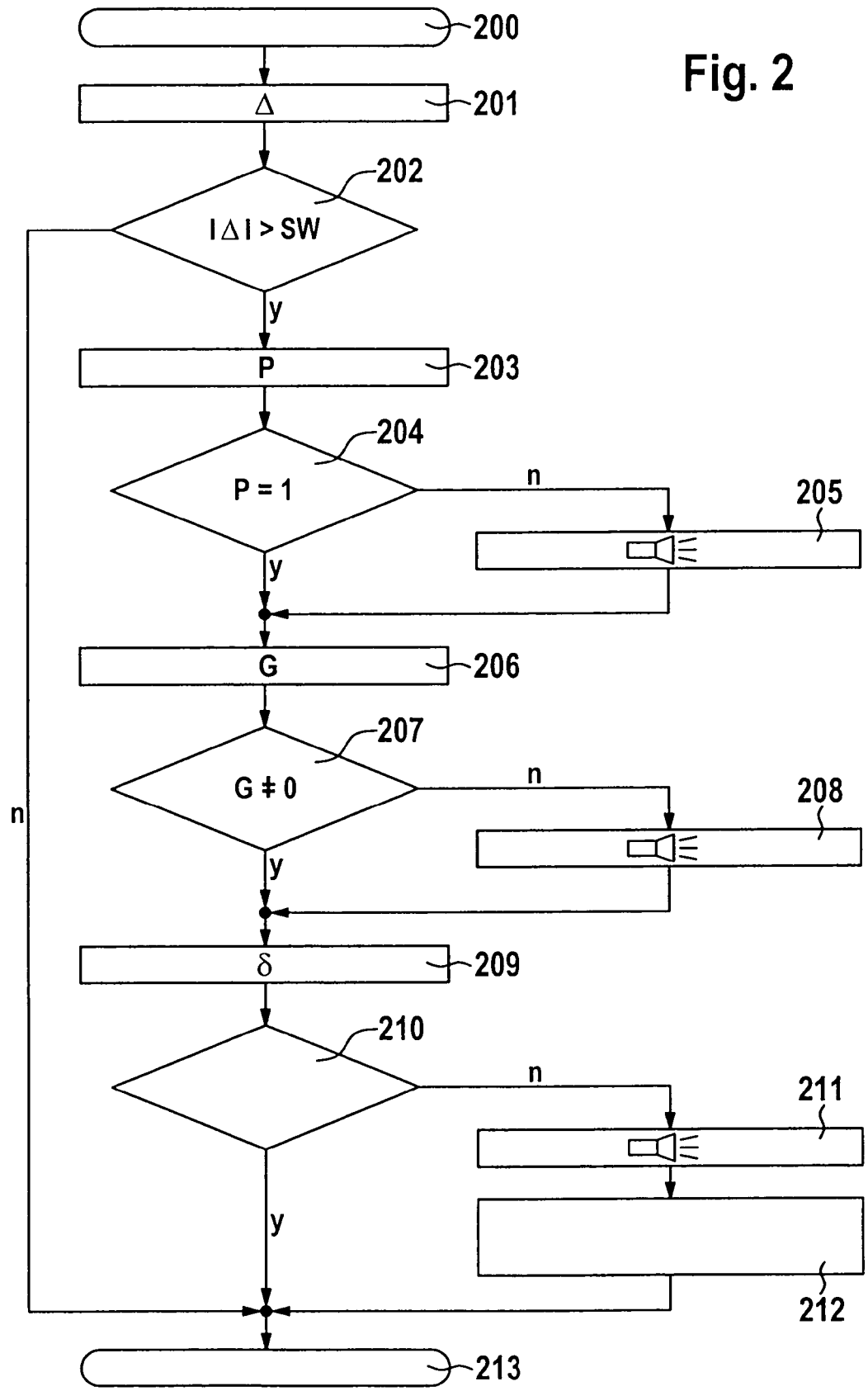
FIG. 2 shows the method according to the present invention in the form of a flow chart.

In a vehicle equipped with an automatic transmission, instead of checking whether a gear is engaged, a check may be performed as to whether the automatic transmission is in the parking position. The sequence of the method according to the present invention is shown in FIG. 2.

The method started in block 200 with the parking of the motor vehicle. For this purpose, a check is performed as to whether the velocity is zero. Subsequently, a check is performed in block 201 as to whether there is a longitudinal inclination $\Delta$ of the roadway. In block 202, a query is made as to whether the magnitude $|\Delta|$ of the longitudinal inclination of the roadway exceeds a specified limit value SW. If this is the case (always indicated in FIG. 2 by "y"), then the system proceeds to block 203. If this is not the case (always indicated in FIG. 2 by "n"), then the system jumps to the end of the method in block 213.

In block 203, the status P of the handbrake or parking brake or immobilization brake is queried. Subsequently, a query is made in block 204 whether the handbrake is set or whether the immobilization brake is in a secured or blocked state. This is indicated by query P=1. If the reply is "no", then a warning is issued to the driver in block 205. If the reply is "yes", then the engaged gear G is ascertained in block 206. In vehicles having an automatic transmission, the operating state of the automatic transmission is ascertained instead. The subsequent query 207 indicated by "G≠0" ascertains whether a gear is engaged (or in automatic transmission vehicles: whether the parking position is engaged). If the reply is "no", then a warning information is issued to the driver in block 208 and the system proceeds to block 209. If the reply is "yes", then the steering angle $\delta$ is transmitted in block 209. Subsequently, a query is made in block 210 whether the magnitude of the steering angle exceeds a minimum value specified on the basis of the longitudinal inclination of the roadway and/or whether the direction of the steering angle is correct. If this is the case, then the method is concluded in block 213. If the query in block 210, however, yields the reply "no" (i.e. steering angle is too small or pointing in the wrong direction), then a driver warning is issued in block 211. Subsequently, block 213 offers the option of having the steering angle automatically corrected or set based on the ascertained inclination of the roadway. This may occur e.g. with the aid of a parking assistant function.

Figure 3:
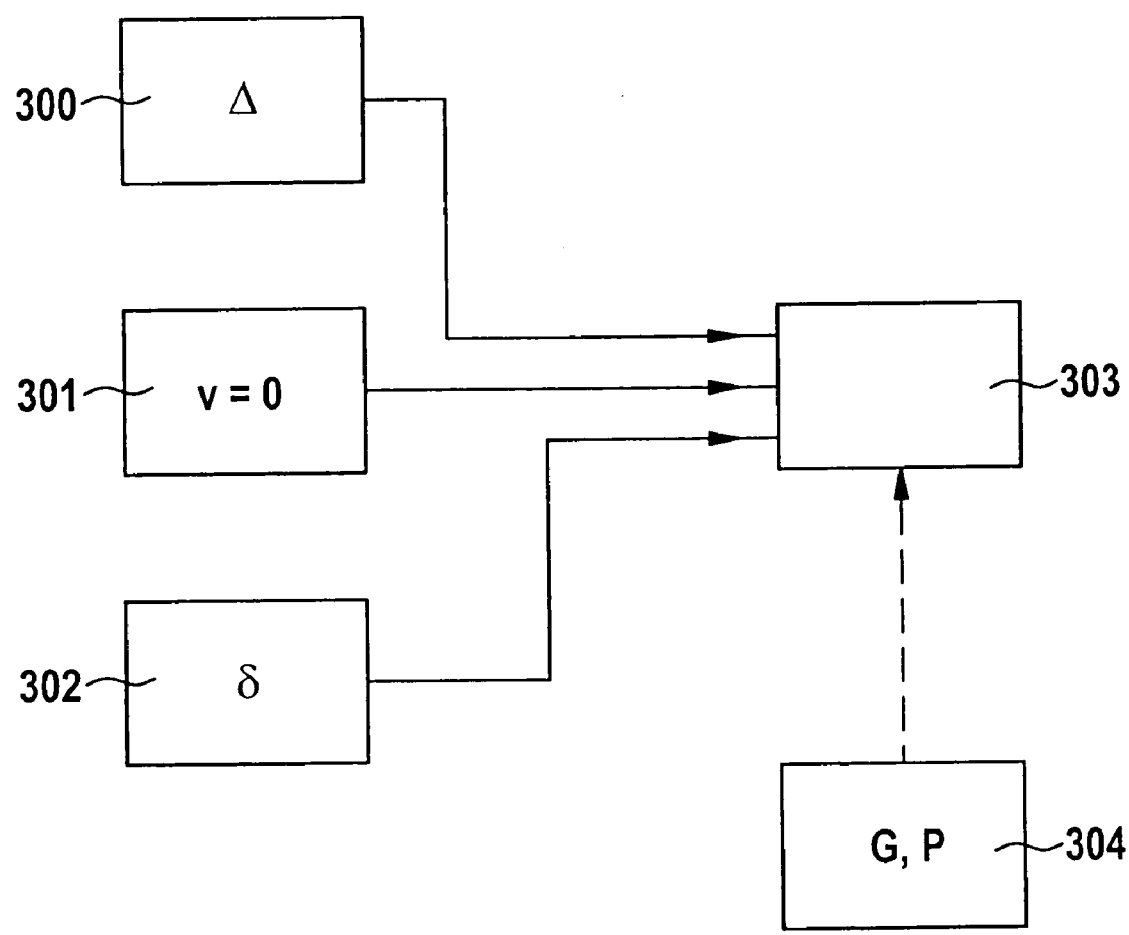
FIG. 3 shows the construction of the device according to the present invention.

The construction of the device according to the present invention is shown in FIG. 3. Where
- 300=inclination ascertainment means for ascertaining an inclination variable $\Delta$ describing the roadway inclination in the longitudinal direction of the vehicle,
- 301=standstill detection means for ascertaining a vehicle standstill (longitudinal velocity of vehicle v=0),
- 302=steering angle ascertainment means for ascertaining a steering angle variable $\delta$ describing the steering angle,
- 303=driver warning means for issuing a driver warning, which are triggered by the inclination ascertainment means, the standstill detection means and the steering angle ascertainment means in such a way that a driver warning is output if
  - the vehicle is at a standstill and
  - the inclination variable $\Delta$ fulfills a specified inclination condition and
  - the steering angle variable $\delta$ fulfills a specified steering angle condition.

Optionally, the driver warning means also receive from block 304 information regarding the set gear G and the state P of the handbrake.

What is claimed is:

1. A method for warning a driver when parking a motor vehicle, comprising:
   ascertaining an inclination variable describing a roadway inclination in a longitudinal direction of the vehicle;
   ascertaining a vehicle standstill;
   ascertaining a steering angle variable describing a steering angle; and in the case of the vehicle standstill, outputting a driver warning information if the inclination variable fulfills a specified inclination condition if the steering angle variable fulfills a specified steering angle condition;

wherein, in the case of the vehicle standstill, an additional warning information is output if the inclination variable fulfills the inclination condition and if one of a handbrake, an immobilization brake, and a parking brake is detected as not activated.

2. The method as recited in claim 1, wherein:
the steering angle variable is the steering angle,
the inclination condition is fulfilled if a magnitude of the inclination variable exceeds an inclination limit value, and
the steering angle condition is fulfilled if a magnitude of the steering angle falls below a steering angle limit value.

3. The method as recited in claim 2, wherein the steering angle limit value is a function of the inclination limit value.

4. A method for warning a driver when parking a motor vehicle, comprising:
ascertaining an inclination variable describing a roadway inclination in a longitudinal direction of the vehicle;
ascertaining a vehicle standstill;
ascertaining a steering angle variable describing a steering angle; and
in the case of the vehicle standstill, outputting a driver warning information if the inclination variable fulfills a specified inclination condition if the steering angle variable fulfills a specified steering angle condition:
wherein:
the steering angle variable is a steering angle direction,
the inclination condition is fulfilled if a magnitude of the inclination variable exceeds an inclination limit value, and
the steering angle condition is fulfilled if the steering angle direction points in an opposite direction as a specified setpoint steering angle direction.

5. The method as recited in claim 4, wherein:
the inclination variable is used to ascertain whether a roadway in the longitudinal direction of the vehicle is inclined one of uphill and downhill, and
the setpoint steering angle direction in the case of the roadway inclined downhill and in the case of the roadway inclined uphill points in different directions.

6. The method as recited in claim 1, wherein the inclination variable is a longitudinal inclination of the roadway.

7. A method for warning a driver when parking a motor vehicle, comprising:
ascertaining an inclination variable describing a roadway inclination in a longitudinal direction of the vehicle;
ascertaining a vehicle standstill;
ascertaining a steering angle variable describing a steering angle; and
in the case of the vehicle standstill, outputting a driver warning information if the inclination variable fulfills a specified inclination condition if the steering angle variable fulfills a specified steering angle condition;
wherein, in the case of the vehicle standstill, an additional warning information is output:
if the inclination variable fulfills the inclination condition, and one of:
if, provided the vehicle has a manual transmission, no gear is engaged and
if, provided the vehicle has an automatic transmission, the automatic transmission is not set to a parking position.

8. The method as recited in claim 1, wherein, when the steering angle variable fulfills the steering angle condition, a driver-independent steering-servo-system sets the steering angle variable in such a way that the steering angle variable no longer fulfills the steering angle condition.

* * * * *